United States Patent [19]

Kageyama

[11] Patent Number: 5,255,079
[45] Date of Patent: Oct. 19, 1993

[54] APPARATUS FOR CORRECTING A COLOR TONE OF A VIDEO SIGNAL

[75] Inventor: Atsuhisa Kageyama, Osaka, Japan

[73] Assignee: Matsushita Electric Industrial Co., Ltd., Japan

[21] Appl. No.: 707,509

[22] Filed: May 30, 1991

[30] Foreign Application Priority Data

Jun. 5, 1990 [JP] Japan .................. 2-148286

[51] Int. Cl.[5] .............................................. H04N 9/68
[52] U.S. Cl. ........................................ 358/37; 358/166
[58] Field of Search .......................... 358/37, 166, 164

[56] References Cited

U.S. PATENT DOCUMENTS

| | | |
|---|---|---|
| 4,337,479 | 6/1982 | Tomimoto et al. . |
| 4,360,830 | 11/1982 | Poetsch et al. ............... 358/37 |
| 4,558,352 | 12/1985 | Sauer ........................... 358/37 |
| 4,812,905 | 3/1989 | Rossi . |
| 4,823,190 | 4/1989 | Yamamoto .................... 358/37 |
| 5,089,891 | 2/1992 | Yamamoto .................... 358/166 |

Primary Examiner—Edward L. Coles, Sr.
Assistant Examiner—Kim Yen Vu
Attorney, Agent, or Firm—Lowe, Price, LeBlanc & Becker

[57] ABSTRACT

A color-tone correcting apparatus includes a first device for detecting a greatest signal of first input component video signals, and outputting the detected greatest signal. A signal device serves to remove small-level components from the output signal of the first device, and to limit an amplitude of the output signal of the first device to within a predetermined amplitude. A third device serves to add an output signal of the second device and a second input component video signal.

15 Claims, 5 Drawing Sheets

FIG. 3(A) — R-Y
FIG. 3(B) — G-Y
FIG. 3(C) — B-Y
FIG. 3(D) SLICING LEVEL — d
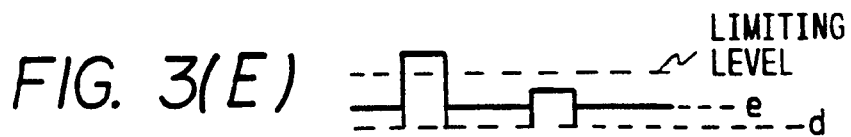
FIG. 3(E) LIMITING LEVEL — e, d
FIG. 3(F) — f
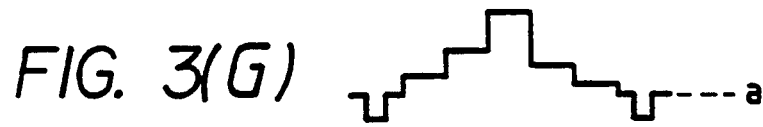
FIG. 3(G) — a
FIG. 3(H) — b FIG. 6
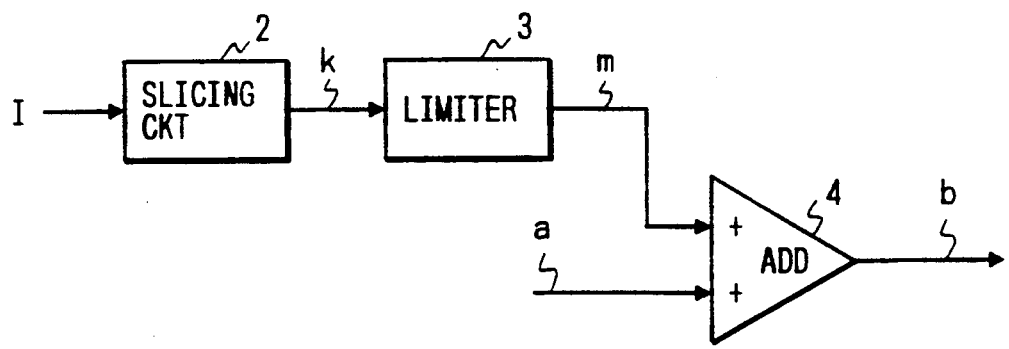
FIG. 7(A)
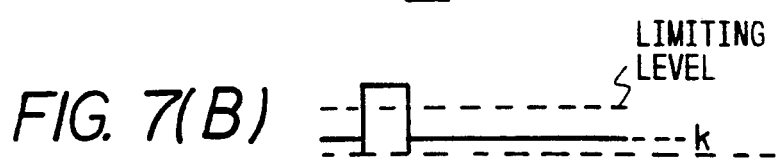
FIG. 7(B)
FIG. 7(C)
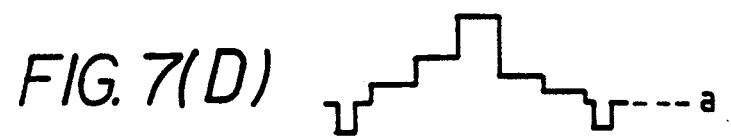
FIG. 7(D)
FIG. 7(E)

APPARATUS FOR CORRECTING A COLOR TONE OF A VIDEO SIGNAL

BACKGROUND OF THE INVENTION

This invention relates to an apparatus for correcting a color-tone component of a video signal. This invention also relates to a television receiver including such a color-tone correcting apparatus.

In the field of color television receivers, there are various apparatuses for correcting a color-tone component of a video signal to clarify a reproduced color image. As will be explained later, a prior art color-tone correcting apparatus has some problems.

SUMMARY OF THE INVENTION

It is an object of this invention to provide an improved apparatus for correcting a color tone of a video signal.

It is another object of this invention to provide a television receiver including such a color-tone correcting apparatus.

A first aspect of this invention provides a color-tone correcting apparatus comprising first means for detecting a greatest signal of a plurality of first input component video signals, and outputting the detected greatest signal; second means for removing small-level components from the output signal of the first means, and for limiting an amplitude of the output signal of the first means to within a predetermined amplitude; and third means for adding an output signal of the second means and a second input component video signal.

A second aspect of this invention provides a television receiver comprising a color-tone correcting apparatus which comprises first means for detecting a greatest signal of a plurality of first input component video signals, and outputting the detected greatest signal; second means for removing small-level components from the output signal of the first means, and for limiting an amplitude of the output signal of the first means to within a predetermined amplitude; and third means for adding an output signal of the second means and a second input component video signal.

A third aspect of this invention provides a color-tone correcting apparatus comprising first means for detecting a greatest signal of at least two of a color difference signal R-Y, a color difference signal B-Y, and a color difference signal G-Y, and outputting the detected greatest signal; second means for removing small-level components from the output signal of the first means; third means for limiting an amplitude of an output signal of the second means to within a predetermined amplitude; and fourth means for adding an output signal of the third means and a second input component video signal.

A fourth aspect of this invention provides a television receiver comprising a color-tone correcting apparatus which comprises first means for detecting a greatest signal of at least two of a color difference signal R-Y, a color difference signal B-Y, and a color difference signal G-Y, and outputting the detected greatest signal; second means for removing small-level components from the output signal of the first means; third means for limiting an amplitude of an output signal of the second means to within a predetermined amplitude; and fourth means for adding an output signal of the third means and a second input component video signal.

A fifth aspect of this invention provides a color-tone correcting apparatus comprising first means for detecting a greatest signal of a color signal "I" and a color signal "Q", and outputting the detected greatest signal; second means for removing small-level components from the output signal of the first means; third means for limiting an amplitude of an output signal of the second means to within a predetermined amplitude; and fourth means for adding an output signal of the third means and a second input component video signal.

A sixth aspect of this invention provides a television receiver comprising a color-tone correcting apparatus which comprises first means for detecting a greatest signal of a color signal "I" and a color signal "Q", and outputting the detected greatest signal; second means for removing small-level components from the output signal of the first means; third means for limiting an amplitude of an output signal of the second means to within a predetermined amplitude; and fourth means for adding an output signal of the third means and a second input component video signal.

A seventh aspect of this invention provides a color-tone correcting apparatus comprising means for limiting a level of a color-representing component video signal, and converting the color-representing component video signal into a corrective signal; and means for correcting a luminance-representing component video signal in response to the corrective signal.

BRIEF DESCRIPTION OF THE DRAWINGS

FIGS. 3A-3H are time-domain diagrams showing the waveforms of various signals in the color-tone correcting apparatus of FIG. 2.

FIG. 6 is a block diagram of a color-tone correcting apparatus according to a third embodiment of this invention.

FIGS. 7A-7E are time-domain diagrams showing the waveforms of various signals in the color-tone correcting apparatus of FIG. 6.

DESCRIPTION OF THE PRIOR ART

Figure 1:
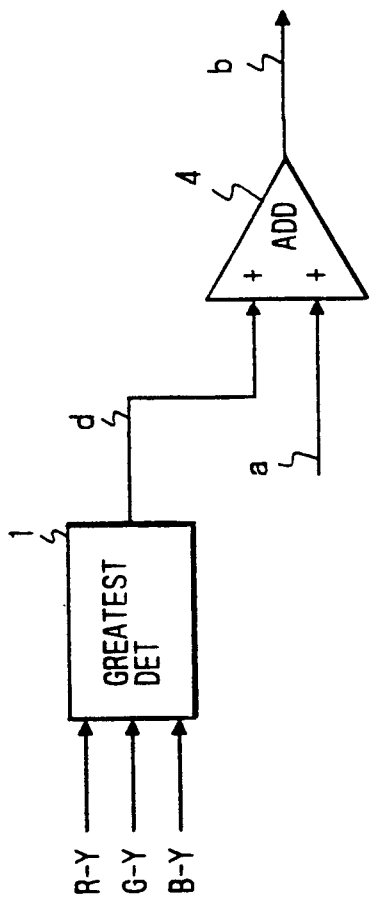
FIG. 1 is a block diagram of a prior art color-tone correcting apparatus.

As shown in FIG. 1, a prior art color-tone correcting apparatus includes a greatest detector 1 and an adder 4. The greatest detector 1 detects the greatest of three color difference signals R−Y, G−Y, and B−Y, and selects the greatest color difference signal and outputs the selected color difference signal "d". As will be made clear later, the greatest color difference signal "d" is used as a color-tone corrective signal or a luminance corrective signal. The adder 4 adds an input luminance signal "a" and the greatest color difference signal "d", combining the signals "a" and "d" into a final luminance signal "b". In other words, the adder 4 corrects the input luminance signal "a" into the final luminance signal "b" in response to the color difference signal "d".

The prior art color-tone correcting apparatus of FIG. 1 has the following problems. When the greatest color difference signal "d" has noise components, the final luminance signal "b" results from the addition of the greatest color difference signal "d" and the input luminance signal "a". When the greatest color difference signal "d" has a large level, the final luminance signal "b" tends to be extremely large in level so that the color of the corresponding part of a reproduced image tends to be appreciably lighter than the original color.

Figure 2:
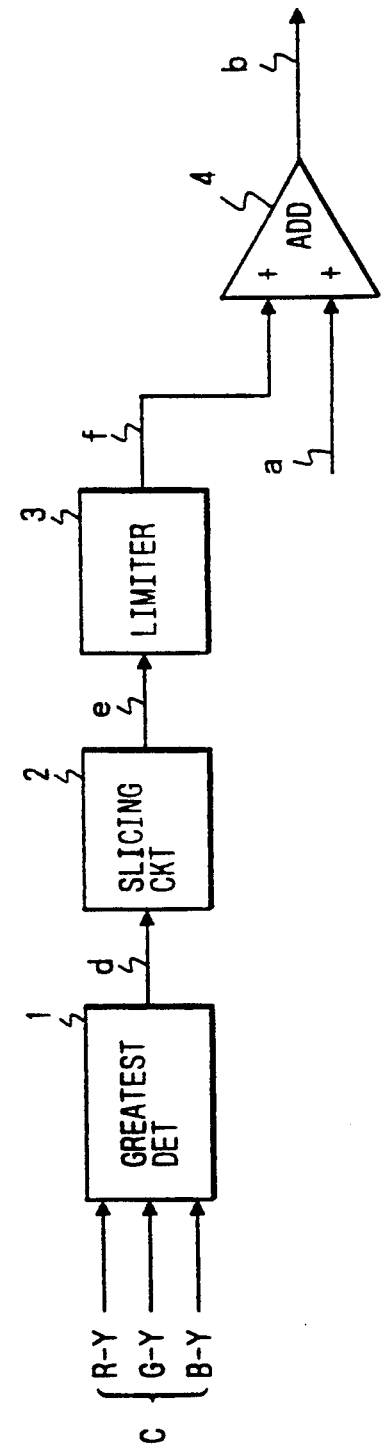
FIG. 2 is a block diagram of a color-tone correcting apparatus according to a first embodiment of this invention.

DESCRIPTION OF THE FIRST PREFERRED EMBODIMENT with reference to FIG. 2, a color-tone correcting apparatus of a first embodiment of this invention includes a greatest detector 1, a slicing circuit 2, a limiter 3, and an adder 4.

A group "c" of three color difference signals R−Y, B−Y, and C−Y is inputted into the greatest detector 1. The greatest detector 1 detects the greatest of the three color difference signals R−Y, G−Y, and B−Y, and selects the greatest color difference signal and outputs the selected color difference signal "d". For example, when the levels of the three color difference signals R−Y, G−Y, and B−Y increase and decreases as shown in the parts (A)-(C) of FIG. 3, the greatest color difference signal "d" varies as shown in the part (D) of FIG. 3.

The slicing circuit 2 receives the greatest color difference signal "d" from the greatest detector 1. The slicing circuit 2 slices the greatest color difference signal "d" with a predetermined slicing level, and thereby converts the greatest color difference signal "d" into a color difference signal "e". Specifically, the slicing circuit 2 transmits the greatest color difference signal "d" which has a level equal to or greater than the slicing level, but cuts off the greatest color difference signal "d" which has a level below the slicing level. For example, when the level of the greatest color difference signal "d" varies around the slicing level as shown in the part (D) of FIG. 3, the output color difference signal "e" from the slicing circuit 2 varies as shown in the part (E) of FIG. 3. In this way, the slicing circuit 2 cuts off the small-level part of the color difference signal "d". Cutting off the small-level part of the color difference signal "d" suppresses or decreases noise components of the color difference signal "d".

The limiter 3 receives the noise-suppressed color difference signal "e" from the slicing circuit 2. The limiter 3 limits the amplitude of the color difference signal "e" to within a predetermined amplitude, and thereby converts the color difference signal "e" into a color difference signal "f". Specifically, the limiter 3 prevents the amplitude of the color difference signal "e" from exceeding a predetermined limiting level. As a result, the level of the output color differences signal "f" of the limiter 3 is prevented from going excessively great. For example, when the color difference signal "e" varies around the limiting level as shown in the part (E) of FIG. 3, the output color difference signal "f" from the limiter 3 varies as shown in the part (F) of FIG. 3. As will be made clear later, the color difference signal "f" is used as a color-tone corrective signal or a luminance corrective signal.

The adder 4 receives the amplitude-limited color difference signal "f" from the limiter 3. In addition, the adder 4 receives an input luminance signal "a". The adder 4 adds the color difference signal "f" and the input luminance signal "a", combining the signals "f" and "a" into a final luminance signal "b". In other words, the adder 4 corrects the input luminance signal "a" into the final luminance signal "b" in response to the color-tone corrective signal "f". For example, the color difference signal "f" and the input luminance signal "a" vary as shown in the parts (F) and (G) of FIG. 3, the final luminance signal "b" varies as shown in the part (H) of FIG. 3.

When the greatest color difference signal "d" is large in level, the limiter 3 prevents the level of the color-tone corrective signal "f" from going excessively great. Therefore, even when the greatest color difference signal "d" has a large level, The final luminance signal "b" is prevented from going excessively large in level so that the color of the corresponding part of a reproduced image is prevented from being appreciably lighter than the original color.

This embodiment may be modified as follows. In the first modification of this embodiment, only two of the color difference signals R−Y, G−Y, and B−Y are inputted into the greatest detector 1. For example, only the color difference signals R−Y and B−Y are inputted into the greatest detector 1. In this modification, the slicing circuit 2 has an additional function of removing minus components from the color difference signal "e". In a second modification of this embodiment, the slicing circuit 2 and the limiter 3 are exchanged in position with respect to the arrangement of FIG. 2. In a third modification of this embodiment, the input luminance signal "a" has such a polarity that sync components are positive-going, and the adder 4 is replaced by a subtracter.

DESCRIPTION OF THE SECOND PREFERRED EMBODIMENT

Figure 4:
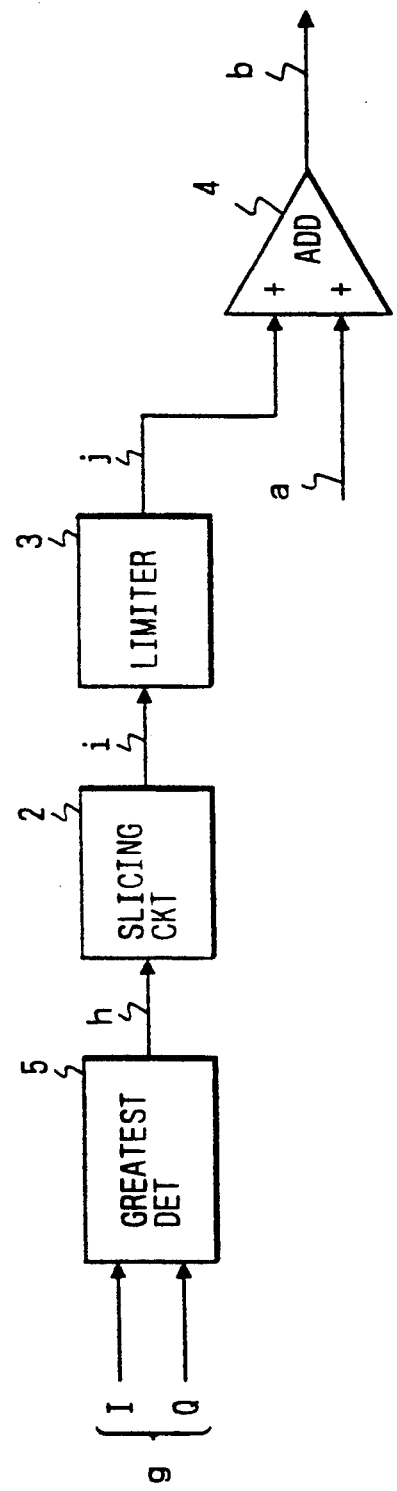
FIG. 4 is a block diagram of a color-tone correcting apparatus according to a second embodiment of this invention.
Figure 5A:
FIGS. 5A-5G are time-domain diagrams showing the waveforms of various signals in the color-tone correcting apparatus of FIG. 4.
Figure 5B:
Figure 5C:
Figure 5D:
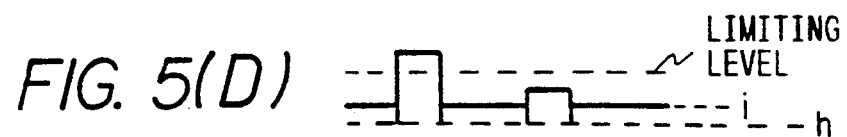
Figure 5E:
Figure 5F:
Figure 5G:

With reference to FIG. 4, a color-tone correcting apparatus of a second embodiment of this invention includes a greatest detector 5, a slicing circuit 2, a limiter 3, and an adder 4.

A pair "g" of color signals "I" and "Q" is inputted into the greatest detector 5. The greatest detector 5 detects the greatest of the color signals "I" and "Q", and selects the greatest color signal and outputs the selected color signal "h". For example, when the levels of the color signals "I" and "Q" increase the decrease as shown in the parts (A) and (B) of FIG. 5, the greatest color signal "h" varies as shown in the part (C) of FIG. 5.

In the NTSC system, the color signals "I" and "Q" have the following relations with the color difference signals R−Y and B−Y.

$$I = 0.74(R-Y) - 0.27(B-Y)$$

$$Q = 0.48(R-Y) + 0.41(B-Y)$$

These relations means that a wide transmission band is allotted to orange and cyan components (I-axis components) and a narrow transmission band is allotted to green and magenta components (Q-axis components). The color subcarrier is modulated with the color signals "I" and "Q".

The slicing circuit 2 receives the greatest color signal "h" from the greatest detector 5. The slicing circuit 2 slices the greatest color signal "h" with a predetermined slicing level, and thereby converts the greatest color signal "h" into a color signal "i". Specifically, the slicing circuit 2 transmits the greatest color signal "h" which has a level equal to or greater than the slicing level, but cuts off the greatest color signal "h" which has a level below the slicing level. For example, when the level of the greatest color signal "h" varies around the slicing level as shown in the part (C) of FIG. 5, the output color signal "i" from the slicing circuit 2 varies as shown in the part (D) of FIG. 5. In this way, the slicing circuit 2 cuts off the small-level part of the color signal "h". Cutting off the small-level part of the color signal "h" suppresses or decreases noise components of the color signal "h".

The limiter 3 receives the noise-suppressed color signal "i" from the slicing circuit 2. The limiter 3 limits the amplitude of the color signal "i" to within a predetermined amplitude, and thereby converts the color signal "i" into a color signal "j". Specifically, the limiter 3 prevents the amplitude of the color signal "i" from exceeding a predetermined limiting level. As a result, the level of the output color signal "j" of the limiter 3 is prevented from going excessively great. For example, when the color signal "i" varies around the limiting level as shown in the part (D) of FIG. 5, the output color signal "j" from the limiter 3 varies as shown in the part (E) of FIG. 5. As will be made clear later, the color signal "j" is used as a color-tone corrective signal or a luminance corrective signal.

The adder 4 receives the amplitude-limited color signal "j" from the limiter 3. In addition, the adder 4 receives an input luminance signal "a". The adder 4 adds the color signal "j" and the input luminance signal "a", combining the signals "j" and "a" into a final luminance signal "b". In other words, the adder 4 corrects the input luminance signal "a" into the final luminance signal "b" in response to the color-tone corrective signal "j". For example, the color signal "j" and the input luminance signal "a" vary as shown in the parts (E) and (F) of FIG. 5, the final luminance signal "b" varies as shown in the part (G) of FIG. 5.

When the greatest color signal "h" is large in level, the limiter 3 prevents the level of the color-tone corrective signal "j" from going excessively great. Therefore, even when the greatest color signal "h" has a large level, the final luminance signal "b" is prevented from going excessively large in level so that the color of the corresponding part of a reproduced image is prevented from being appreciably lighter than the original color.

This embodiment may be modified as follows. In a first modification of this embodiment, the slicing circuit 2 and the limiter 3 are exchanged in position with respect to the arrangement of FIG. 4. In a second modification of this embodiment, the input luminance signal "a" has such a polarity that sync components are positive-going, and the adder 4 is replaced by a subtracter.

DESCRIPTION OF THE THIRD PREFERRED EMBODIMENT

A color-tone correcting apparatus of a third embodiment of this invention features that a color-tone component of a video signal is corrected in response to a color signal "I". Since the color signal "I" closely relates to a color which is generally sensed by human eyes at a highest sensitivity, the use of the color signal "I" enables an effective color-tone correction.

With reference to FIG. 6, a color-tone correcting apparatus of a third embodiment of this invention includes a slicing circuit 2, a limiter 3, and an adder 4.

A color signal "I" is inputted into the slicing circuit 2. The slicing circuit 2 slices the color signal "I" with a predetermined slicing level, and thereby converts the color signal "I" into a color signal "k". Specifically, the slicing circuit 2 transmits the color signal "I" which has a level equal to or greater than the slicing level, but cuts off the color signal "I" which has a level below the slicing level. For example, when the level of the color signal "I" varies around the slicing level as shown in the part (A) of FIG. 7, the output color signal "k" from the slicing circuit 2 varies as shown in the part (B) of FIG. 7. In this way, the slicing circuit 2 cuts off the small-level part of the color signal "I". Cutting off the small-level part of the color signal "I" suppresses or decreases noise components of the color signal "I".

The limiter 3 receives the noise-suppressed color signal "k" from the slicing circuit 2. The limiter 3 limits the amplitude of the color signal "k" to within a predetermined amplitude, and thereby converts the color signal "k" into a color signal "m". Specifically, the limiter 3 prevents the amplitude of the color signal "k" from exceeding a predetermined limiting level. As a result, the level of the output color signal "m" of the limiter 3 is prevented from going excessively great. For example, when the color signal "k" varies around the limiting level as shown in the part (B) of FIG. 7, the output color signal "m" from the limiter 3 varies as shown in the part (C) of FIG. 7. As will be made clear later, the color signal "m" is used as a color-tone corrective signal or a luminance corrective signal.

The adder 4 receives the amplitude-limited color signal "m" from the limiter 3. In addition, the adder 4 receives an input luminance signal "a". The adder 4 adds the color signal "m" and the input luminance signal "a", combining the signals "m" and "a" into a final luminance signal "b". In other words, the adder 4 corrects the input luminance signal "a" into the final luminance signal "b" in response to the color-tone corrective signal "m". For example, the color signal "m" and the input luminance signal "a" vary as shown in the parts (C) and (D) of FIG. 7, the final luminance signal "b" varies as shown in the part (E) of FIG. 7.

When the color signal "I" is large in level, the limiter 3 prevents the level of the color-tone corrective signal "m" from going excessively great. Therefore, even when the color signal "I" has a large level, the final luminance signal "b" is prevented from going excessively large in level so that the color of the corresponding part of a reproduced image is prevented from being appreciably lighter than the original color.

This embodiment may be modified as follows. In a first modification of this embodiment, the slicing circuit 2 and the limiter 3 are exchanged in position with respect to the arrangement of FIG. 6. In a second modification of this embodiment, the input luminance signal "a" has such a polarity that sync components are positive-going, and the adder 4 is replaced by a subtracter.

What is claimed is:

1. A color-tone correcting apparatus comprising:
    first means for detecting a greatest signal of first input component video signals, and outputting the detected greatest signal;
    second means for removing small-level components from the output signal of the first means, and limiting an amplitude of the output signal of the first means to within a predetermined amplitude; and
    third means for adding an output signal of the second means and a second input component video signal.

2. The color-tone correcting apparatus of claim 1 wherein the first input component video signals comprise color difference signals, and the second input component video signal comprises a luminance signal.

3. The color-tone correcting apparatus of claim 2 wherein the color difference signals comprise a color difference signal R−Y, a color difference signal B−Y, and a color difference signal G−Y.

4. The color-tone correcting apparatus of claim 2 wherein the color difference signals comprise a color difference signal R−Y, and a color difference signal B−Y.

5. The color-tone correcting appartus of claim 1 wherein the first input component video signals comprise a color signal "I" and a color signal "Q", and the second input component video signal comprises a luminance signal.

6. The color-tone correcting apparatus of claim 1 wherein the first input component video signals comprise a color signal "I", and the second input component video signal comprises a luminance signal.

7. A television receiver comprising a color-tone correcting apparatus which comprises:
   first means for detecting a greatest signal of first input component video signals, and outputting the detected greatest signal;
   second means for removing small-level components from the output signal of the first means, and limiting an amplitude of the output signal of the first means to within a predetermined amplitude; and
   third means for adding an output signal of the second means and a second input component video signal.

8. A color-tone correcting apparatus comprising:
   first means for detecting a greatest signal of at least two of a color difference signal R−Y, a color difference signal B−Y, and a color difference signal G−Y, and outputting the detected greatest signal;
   second means for removing small-level components from the output signal of the first means;
   third means for limiting an amplitude of an output signal of the second means to within a predetermined amplitude; and
   fourth means for adding an output signal of the third means and a second input component video signal.

9. A television receiver comprising a color-tone correcting apparatus which comprises:
   first means for detecting a greatest signal of at least two of a color difference signal R−Y, a color difference signal B−Y, and a color difference signal G−Y, and outputting the detected greatest signal;
   second means for removing small-level components from the output signal of the first means;
   third means for limiting an amplitude of an output signal of the second means to within a predetermined amplitude; and
   fourth means for adding an output signal of the third means and a second input component video signal.

10. A color-tone correcting apparatus comprising:
    first means for detecting a greatest signal of a color signal "I" and a color signal "Q", and outputting the detected greatest signal;
    second means for removing small-level components from the output signal of the first means;
    third means for limiting an amplitude of an output signal of the second means to within a predetermined amplitude; and
    fourth means for adding an output signal of the third means and a second input component video signal.

11. A television receiver comprising a color-tone correcting apparatus which comprises:
    first means for detecting a greatest signal of a color signal "I" and a color signal "Q", and outputting the detected greatest signal;
    second means for removing small-level components from the output signal of the first means;
    third means for limiting an amplitude of an output signal of the second means to within a predetermined amplitude; and
    fourth means for adding an output signal of the third means and a second input component video signal.

12. A color-tone correcting apparatus comprising:
    means for limiting a level of a color-representing component video signal, and converting the color-representing component video signal into a corrective signal; and
    means for correcting a luminance-representing component video signal in response to the corrective signal.

13. The color-tone correcting apparatus of claim 12 further comprising a slicing circuit.

14. The color-tone correcting apparatus of claim 12 wherein the limiting means comprises an amplitude limiter.

15. The color-tone correcting apparatus of claim 12 further comprising a slicing circuit and wherein the limiting means comprises an amplitude limiter.

* * * * *